United States Patent [19]

Tanner

[11] 4,326,854
[45] Apr. 27, 1982

[54] SYNTHETIC FIRELOG

[76] Inventor: John D. Tanner, 1362 Tremblay St., Oshawa, Ontario, Canada

[21] Appl. No.: 172,990

[22] Filed: Jul. 28, 1980

Related U.S. Application Data

[63] Continuation of Ser. No. 19,271, Mar. 9, 1979, abandoned.

[51] Int. Cl.$^3$ ............................ C10L 5/14; C10L 5/00
[52] U.S. Cl. ................................. 44/10 B; 44/15 B; 44/16 R; 44/24
[58] Field of Search ................. 44/10 R, 10 A, 10 B, 44/ 15 B, 15 D, 15 R, 16 R, 24, 7 A, 21

[56] References Cited

U.S. PATENT DOCUMENTS

| | | | |
|---|---|---|---|
| 778,096 | 12/1904 | Barnes | 44/15 R |
| 1,138,016 | 5/1915 | Schneider | 44/16 R |
| 1,590,706 | 6/1926 | Spencer | 44/16 R |
| 2,017,402 | 10/1935 | Komarek | 44/15 R |
| 2,789,890 | 4/1957 | Stevens | 44/41 |
| 3,297,419 | 1/1967 | Eyre, Jr. | 44/10 R |
| 4,043,765 | 8/1977 | Tanner | 44/10 R |

FOREIGN PATENT DOCUMENTS

| | | | |
|---|---|---|---|
| 2071662 | 9/1971 | France | 44/15 B |

*Primary Examiner*—Carl F. Dees

[57] ABSTRACT

A synthetic firelog is made by binding cellulosic particles with a combustible binder produced by the interaction of a liquid combustible by-product or waste product and a modifier, the resulting material being such as to be carbonizable on combustion to form a porous skeleton which maintains the shape of the log during burning. The by-product may be molasses, various waste oils or pitches, or sulphite lye and the modifier interacts physically or chemically therewith to form a plastic, thixotropic binder material. The cellulosic material may be sawdust, paper, or any of a variety of cellulosic residues from the processing of vegetable materials.

5 Claims, 6 Drawing Figures

SYNTHETIC FIRELOG

This is a continuation of application Ser. No. 019,271, filed Mar. 9, 1979, now abandoned.

FIELD OF THE INVENTION

The present invention relates to synthetic firelogs, and more particularly to synthetic firelogs made without wax, or with a reduced wax content.

BACKGROUND OF THE INVENTION

Conventional synthetic fireplace logs generally contain up to about 65% by weight of oil refinery slack waxes which are physically admixed with finely divided wood particles and extruded into the desired log-like shape. However, with reserves of crude mineral oil dwindling, energy conservation is becoming increasingly important, and the prices of oil-derived products are rapidly increasing. Synthetic firelogs, although generally quite fuel-efficient, are increasing in price. Moreover, with more important end uses for the waxes available, such as conversion to gasoline or plastic monomers, it is unlikely that sufficient slack waxes of adequate quality will be available for use by the synthetic log industry in the future. Some of the 'waxes' now available are in fact more in the nature of refinery slops, and are quite unsuitable for conventional methods of synthetic firelog manufacture.

SUMMARY OF THE INVENTION

It has now been found that synthetic firelogs may be manufactured using materials other than slack waxes if such materials can be treated to give the logs manufactured therefrom the desired properties.

According to the invention, a synthetic firelog comprises a log-shaped extruded mass of a materials sufficiently solid to hold its shape at normal room temperature, the material comprising a liquid combustible by-product and at least one further component interacted with the liquid combustible by-product to form therewith a solid having a degree of plasticity and thixotropy such as to render it extrudable under the influence of heat and pressure, the log having a combustibility providing a safe but aesthetically acceptable rate of burning under firegrate conditions from the time when the log is fully alight until its volatilizable combustible content is substantially exhausted, and the log material being such as to leave during burning a skeleton which substantially maintains the shape and dimensions of the log whilst being sufficiently porous to avoid smothering the combustion of volatile constituents of the log as its burning proceeds.

By by-products are meant secondary or waste products resulting from a process of making some other product, and mixtures of such products.

In one form of the invention, the at least one further component includes up to 70% by weight and preferably about 35%–40% by weight of a particulate cellulosic material which carbonizes to form the skeleton. Enough cellulosic material may be present to form during burning a porous carbonized skeleton which substantially maintains the shape and dimensions of the log. The formation of such a skeleton may also be achieved or assisted by the formation of coke on combustion of the liquid combustible waste product, or by an alternative or additional further component which either carbonizes to form a suitable skeleton, and/or itself provides such a skeleton.

In some cases, the at least one further component can entirely consist of particulate cellulosic material which not only forms the skeleton but is able selectively to absorb liquid components from the liquid by-product and reduce the latter to an extrudable solid, whilst in other instances the at least one further component provides a structure within which the liquid by-product is dispersed to form an extrudable solid, the structure also providing the skeleton on combustion of the log. In most cases, however, at least two further components will be utilized, one, which will usually be particles of cellulosic material, with the primary function of forming the skeleton, and the other with the primary function of solidifying the liquid by-product. Either component, together with further components and modifications to the physical structure of the log may be utilized to achieve the desired rate and completeness of burning of the log. Thus the combustion properties of the log may be controlled by one or more of the shaping of the log, the inclusion of flaws or flaw inducing means in the log, the character and particle size of the particulate material, the inclusion of a combustion modifying additive, controlling the order and vigor of admixture of the various ingredients, and the selection of the by-product and the further component or components.

The component or components interacting with the by-product may comprise one or more substances combining physically therewith to a solid solution or gel or other solid dispersion, and/or chemically therewith to form solids.

Suitable liquid combustible by-products include pitch residues from the treatment of vegetable or animal materials; asphalts and coal tar pitches, creosote residues; sugar refining by-products; organic by-products of pulp and paper production; used, spent or spoiled lubricating or industrial or cooking oils; crude soaps or fatty residues from the soap industry; crude oils and fats or residues thereof from industries processing vegetable or animal oils; by-products from the manufacture of starches and polysaccharides; and refinery bottoms, slops and oil pitches.

In order to convert the foregoing materials into extrudable solids that can be combined with cellulosic particles to form satisfactory synthetic firelogs, they are combined with modifiers selected to provide the necessary solidifying and/or plasticizing effect such as fatty acids, fatty acid salts, or glycerides; waxes, solid solution forming synthetic polymers; synthetic or natural surfactants, soaps; rosins and rosin modified plastics; synthetically modified natural products such as stearates and gums; solid hydrocarbons either natural or synthetic; and lignosulphonates, lignin or sulphite lyes. In some cases, one liquid combustible waste or by-product may be used as a modifier for another such product, or the waste or by-product may partially replace a fuel conventionally used in firelogs, such as slack wax, which itself acts as a modifier for the waste or by-product.

In order to permit efficient combustion of the synthetic firelog, the following further materials may be included in the fuel-modifier mixture in order to control the combustibility of the resulting log: non-porous extenders, such as clays, graphite, coal dust, diatomaceous earths, silica, mica etc; oxidising agents to assist combustion such as perborates, peroxides or persulphates; acid generating media to catalyse thermal degradation;

alkaline media to block thermal polymerisation or produce higher melting point materials; chemically active materials to assist in ring opening or double bond breaking; fire retardants to extend burning times; and low flash point liquids and solids to maintain continuous combustion.

Efficient combustion of the synthetic firelogs may also be assisted by the selection of the shape of the extruded logs. The logs may have grooved surfaces to assist in the propagation of the flames; or may be hollow, or extruded with holes therein or therethrough. Conventionally shaped logs may also be produced with intentional flaws therein, or with agents included therein to inducing flawing or cracking during burning and thus assist in the complete combustion of the log.

Further features of the invention will be apparent from the following more detailed description of preferred embodiments.

DESCRIPTION OF THE PREFERRED EMBODIMENTS

In the following description, all parts and percentages are by weight, unless otherwise stated.

Among the combustible liquid by-products which may be used in the manufacture of the novel synthetic firelogs of the present invention are:

Vegetable Pitches and Tall Oil Pitches and Sulphite Lyes

These materials are respectively by-products of the destructive distillation of vegetables, seeds, leaves and flowers; by-products of destructive distillation of timber; and by-products of the destructive extraction of cellulose from timber to form paper.

Vegetable seeds such as coconut, soyabean, sunflower, corn, ground nut, almond, olive, palm, castor, babassu, cotton, linseed, oiticia, perilla, canbra, safflower, sesame, and tung are chemically separated on a large scale to produce such fatty acids as stearic, oleic, linoleic, linoleric, palmitic, myristic, lauric and ricinoleic acids. Complex mixtures of these and many other acids obtained are then separated into refined or semi-refined blends or cuts, and have many uses in the manufacture of soaps, varnishes, paints, plastics and cosmetics. A viscous dark coloured pitch remains after the removal of the useful acids, and contains high molecular weight acids and organic debris. This vegetable pitch can usefully be converted into a solid fuel suitable for synthetic log manufacture.

A similar material, a by-product of the destructive distillation of wood, is called tall oil pitch. By a similar process, the useful acids and chemicals are removed from wood to leave a dark viscous end product, having a similar composition to vegetable pitch and composed of organic high molecular weight acids and debris. The chemical constituents of tall oil pitch are generally more unsaturated or higher in aromatic content then those of vegetable pitch.

Sulphite lyes are produced from timber as a by-product of the paper industry. When paper is made from wood, the resinous organic constituents are dissolved out of the cellulose cells in the form of aqueous solutions of sulphates, sulphonates or sulphites. The solutions, commonly having 40–60% solids content, are called "lyes" or "liquors" and generically "sulphite", lignin or "ligno" describes the salt product. Hence, they are commonly called "sulphite lyes", "lignosulphonate liquor", "lignin liquor" or even more generally "pulp liquor".

In order to use the foregoing materials in log manufacture, the pitches, which can vary from highly viscous, sticky liquids having a viscosity of 3000–15000 centiposes at 20° C. to mobile viscous liquids of slurries of viscosity as low as a few hundred centiposes, are converted to extrudable solids. Ideally the fuels used for synthetic firelogs are firm solids at room temperature and thus hard logs which will transport without damage are obtained. It has been found that the viscous vegetable and tall oil pitches can be converted into extrudable solids by the incorporation of suitable modifiers such as:

(1) Solid fatty acids or fatty acids salts, such as sodium stearate, oleate and linoleate, or the corresponding aluminum, calcium, barium, potassium or strontium salts.

(2) Petroleum or natural waxes such as paraffin, slack, micro-crystalline, carnuba, montan and bees' wax.

(3) Wood resins and modified wood resins such as rosin esters of various types, dimeric rosin acids, polymerised resins dehydrogenated resins, hydrogenated resins, and alkyd and phenolic copolymers of rosins.

(4) Synthetic high molecular weight polymers such as polyethylene, phenolic novalacs, polyethylene glycols, polybutadienes, silicones, polyxylene, polybutylene, polyisobutylene, polypropylene, ethylene vinyl acetate polymers, and polyvinyl pyrollidone.

(5) Synthetic surfactants such as nonlyphenols with high ethylene oxide contents, ethylene oxide propylene oxide copolymers (polyglycols), polyglycol ethers, aliphatic oxyalkylated alcohols, and lauryl sulphate and lauryl sulphate ethers.

(6) Solid hydrocarbons such as phenols, resorcinol, naphthalene, quinolene, hydroquinine, phthalates, glutamic anhydride, naphthol, polystyrene and its copolymers and norbornene.

(7) Saccharides, polysaccharides and their acid salts such as sucrose, sorbitol, mannitol, carboxymethyl cellulose, hydroxycelluloses, cellulose resins, starches, gums, alginates, proteins, xanthates and uronates; and (8) Fats such as lard, tallows, suets butter, fish lards, and whale fat.

(9) Neutrailizing agents i.e. alkaline materials which form with the acid components of the pitch salts which soldify or increase the viscosity of the latter. Suitable alkalis are for example sodium hyroxide, potassium hydroxide and sodium carbonate. These may be added to the pitch before it is added to the sawdust or other particulate cellulosic material or directly to a blend of sawdust and pitch. Such neutralization also reduces coking during burning of the log and thus provides a more satisfactory performance. However, it has a disadvantage when chemicals are added to the log composition to induce coloured flames during burning. The normal chemicals used for this purpose are copper sulphate and cuprous chloride, often with ammonium chloride added to improve volatility. Under strongly alkaline conditions such as those produced by sodium hydroxide or carbonate, the copper salts appear to be converted into copper oxides or non volatile salts since the flame colouring effect is noticeably reduced. The desirable solidification or viscosity increase which occurs or neutralization can be achieved without loss of flame colour by the use of weaker bases such as ammonia, ammonium carbonate, monoethanolamine or other organic amines.

Other methods of countering this interference reaction are however more convenient. Firstly, the pitch may be carefully neutralised before addition to the log mix so that no free alkalinity occurs to upset the colour inducing chemicals. A standard titration for free fatty acid on each batch of pitch may be used to determine the exact amount of alkali required which may then be added to the pitch in a pre-blend tank where with sufficient agitation and heat a neutral salt or "soap" may be prepared. Such a "soap" can then be maintained in molten form for subsequent addition to the log mix. A simpler means of neutralization avoiding colour loss is to change the alkali in such a manner that it cannot contact the colour chemicals without first reacting with the pitch. Thus the chemicals may be added to the dry sawdust and mixed with sufficient wax or other water insoluble material so that it is coated. Subsequent addition of pitch in the acid form followed by other fuels (wax etc) and finally the neutralizing alkali ensures that the risk of contact between the alkali and colour chemicals is minimal. Logs made by this method showed no deterioration or loss of flame colour whereas when the alkali was not separated from the colour producing chemicals some permanent loss of flame colour was observed.

(10) Additives which copolymerize with the pitch acids to form solids. Such polymerization can be achieved by a variety of routes and the degree of polymerization or thermal stability of the polymer can be controlled to prevent excessive coking or flaring of the log. Suitable additives or compounds containing active hydroxyl groups such as glycols, formaldehyde condensation polymers such as urea-formaldehyde and phenol-formaldehyde, paraformaldehyde, and epichlorohydrin. For example, the addition of 5 percent by weight of paraformaldehyde to a liquid bend of pitch and sawdust gave a solid which produced excellent logs with good burning properties.

(11) Oxidizing agents. Oxidation of the pitches gives a significant increase in viscosity and can result in the conversion of a liquid pitch into a solid pitch in some cases. This is believed to be caused by oxidative polymerization similar to that achieved in the production of oxidized asphalts and castor oils. The effect can be obtained by the use of air passed through the heated liquid pitch, or by the addition of solid or liquid oxidizing agents such as perborates to the mixture.

Other solid organic material or liquids which can be converted into solids by, for example, neutralization or polymerization, may be suitable for modifying the physical structure of the pitches.

Low cost effectiveness and deleterious properties such as coking, toxicity, sooty flame, and rapid combustibility of some of the above groups or individual modifiers make them less desirable than others for use in synthetic firelogs. The amounts of modifier required are determined by the need for the resulting material to be extrudable and essentially solid at normal ambient temperatures. Certain pitches from distillation plants where maximum recovery of "light ends" is made, have such high viscosity as to require little modification, and as little as for example 0.25–2% by weight a suitably chosen modifier is sufficient to form a solid extrudable blend of the fuel, the modifier, and any further additives employed.

The preferred modifiers are of course the less costly ones and comprise materials from all of the above mentioned groups, including fatty acids and salts; paraffin, slack and microcrystalline waxes; wood resins and their modified forms, polyethylene, phenolic novolacs, polyethylene glycols, EVA polymers, nonylphenols, ethylene oxide-propylene oxide copolymers, polystyrenes, sugars, carbohydrates, starches, gums, all forms of fats or glycerides, and lignosulphonates.

Using 100 parts by weight of a typical pitch as a starting material, a fuel that is a firm solid at room temperature may be obtained by the addition of the amounts specified of the following modifiers: stearic acid, 5–10 parts; hydrogenated glycerides, 5–10 parts; aluminium stearate, 2–5 parts; aluminium octoate, 1–2.5 parts; coconut mono ethanolamine 2–5 parts; nonylphenyl (50 EtO) 2–5 parts; polyethylene glycol (M.W. 6000), 2–5 parts; sodium oleate, 3–10 parts; sodium linoleate, 2–7 parts; wood resin, 3–10 parts; lignosulphonates, 1.5–6 parts; sugars 3–8 parts; polysaccharides 0.25–1 part.

Most of the above ranges of modifier content are suitable for both medium and high viscosity vegetable or wood pitches. Particular blends may also give other desirable features such as smooth extrusion without plugging, and less sooty burning. Specifically, the fatty acids and glycerides or fatty acid salts are particularly satisfactory for obtaining these two features. The salts are known industrially as lubricating soaps and hence addition of these ensures a good lubrication during extrusion of the logs. However, some of the free solid fatty acids polymerise under mild oxidative conditions and elevated temperatures and this can lead to excessive coking. Coking is caused by incomplete combustion, and gives a cohesive carbon structure that can produce a hard skin on the log and result in suffocation of the flame, a very slow flame spread during initial ignition, and small flames with excessively long burning times for the log. Some degree of coking is desirable, as it gives predictable burning times for the logs and minimises the risk of the splitting or breaking up of the log upon combustion. It has been found that neutralisation of the fatty acids to form salt reduces coking, perhaps by removing the active hydrogen on the carboxy group and/or deactivating any active alcohol side chains. In the case of oleic acid, linoleic acid, etc., the neutral salt is the desired form for the same reasons, but also because this salt is a solid whereas the acid is a liquid. Wood rosins are of similar structure chemically and hence these too are preferred in the neutralised form even though they are hard brittle solids and can be used as free acids to give a solid solution with pitches. Similarly the acidic pitches may in some cases be neutralised to optimise their properties. Hence by careful selection of the additive and degree of neutralisation an ideal blend can be selected. Glycerides are also capable of polymerization and coking, acid or alkaline media resulting in the hydrolysis of the ester bond with improved combustion. Other methods of controlling coking have also been found. Unsaturated acids or glycerides burn more readily as a result of the oxidative double bonds e.g. oleic, lineoleic and linolenic acids burn more readily with less coking than does stearic acid or hydrogenated glycerides. Suitable modifiers are hence blends of stearic, oleic, linoleic, linolenic acids which may be partially or wholly neutralised.

The neutralisation may be carried out prior to compounding of the log mix; for example caustic soda in solid or liquid form is added to the acid in predetermined amounts in a suitable mixing vessel. The molten salt produced may then be blended with the pitch for addition to the remainder of the log mix or added directly into the log mix before or after the pitch, preferably after the pitch in order to take advantage of its lubricating property during extrusion of the logs. Neutralisation may also be carried out directly in the log mix, for example, by adding caustic soda, sodium carbonate, aluminium hydroxide, or other alkali to the mixture before or after the addition of the acidic material. A more desirable alternative, since the final mixture has to be cooled to allow extrusion, is to preneutralise the acid to its salt and prepare it in the form of a powder or flake for addition to the log mix. This means that the heat of reaction produced during neutralisation and the latent heat of liquification of the product, do not have to be removed from the mixture before it is extruded.

Coking may also be reduced by the inclusion in the mix of a non porous powdered extender such as graphite, china clay, silica, diatomaceous earth, etc. This extends the liquid phase over a larger surface area part of which is non porous and as a result the cohesion of any carbon coke skeleton formed during combustion is reduced. For example, the addition of 5 parts of china clay to 100 parts of a mix which exhibits severe coking and flame suffocation results in reduced coking and a more continuous burn. A similar effect can be achieved by controlling the particle size of the wood waste carrier or any wicking agent employed. Medium sized wood particles 1/10" 20 mesh 40 mesh and 60 mesh give sufficiently little surface area that the film thickness obtained when coated and saturated with the fuel at normal ratio by weight (40:60) is significant and the carbon skeleton (coke) therefore has a degree of cohesion. If very fine sawdust is used e.g. 80–100 mesh the additional surface area to be wetted results in a thinner fuel film and hence a less cohesive coke skeleton. This has been tested using the following formula:

| Wood Particles | 37.5 pts. by wt. |
| Tall oil pitch | 50.0 pts. by wt. |
| Stearic acid | 10.0 pts. by wt. |

When made with normal sized sawdust (circa 20 mesh) the log suffocated and extinguished itself leaving a hard coked skin and unburnt fuel trapped inside. Replacing the coarse sawdust with 80–100 mesh wood flour gave a much improved log with a less cohesive coked shell and complete combustion was achieved. With the same formula using circa 20 mesh particles a similar improvement was made by the addition of 5 parts china clay or silica or graphite.

Increasing the average particle size to coarser than 10 mesh also had the desired effect of reducing coke coherence. Whilst the surface area of the wood was in theory reduced giving a thicker fuel film, it was found that less solid fuel was required to produce a cohesive log. This resulted in the film thickness being similar to that with 20 mesh wood but the area of contact and number of contact points between the coarser particles was also reduced, and a more complete burn and a less cohesive ash was obtained.

It has also been found that the tendency to coking is reduced when the sawdust is partially or wholly replaced by nut-shell fines, bagasse or paper pulp.

Lignosulphonates are usually manufactured in salt form as a paper mill by-product, and may be used to modify the pitch to provide the desired extrudability and solidification. They are supplied as dark free flowing hydroscopic powders and can be added directly to the sawdust or other cellulosic component of the mixture before or after the pitch or dissolved in the hot pitch prior to spraying on the wood particles.

Starches, sugars, proteins, polysaccharides and carbohydrates in general are suitable for addition to pitches as modifiers. The materials are typically produced from sugar cane, sugar beet, various woods, palm nuts, maple, sorghum, millet, potatoes, corn, etc. Sugars (disaccharides up to the polysaccharides) also have a useful calorific value, but as their molecular weight increases the tendency to cause coking increases. This may be controlled or reduced by the inclusion in the log mix of oxidizing agents such as peroxides, nitrates, persulphates or perborates at levels up to 15%. An alternative method is to induce fission by including in the mix fugitive acids such as aluminium sulphate, ammonium chloride, or acid anhydrides, which on heating or combining with water driven off during combustion become acidic. Acid hydrolysis of the polysaccharides produces readily combustible organic materials such as sorbose, dextrose, glucose, fructose and hexoses. Addition of reducing agents also produces more ready combustion.

Sulfite lyes or liquors can be made suitable for use by methods similar to those described for pitches and molasses, except that neutralization is not applicable as they are already neutral salts in aqueous solution. For example, addition of polyethylene glycols, lecithin pitch, sorbitol, mannitol, nonylphenol adducts at 40 mol ethylene oxide or gelatine can be used to convert these liquids into the preferred solid or semi-solid extrudable material. As the water content of the lyes is relatively high (up to 60%), the amount of modifier required is proportionately higher e.g. 10–20% of soaps or polyethylene glycols are required for lyes or 10–30% nonylphenol adducts or lecithin. This renders the lyes relatively expensive fuel sources and they are better used as a diluting component for higher viscosity material such as molasses. The burning properties of lyes and lignosulphonates are generally better than pitches since they are less subject to polymerization and thus have less tendency to cause coking.

Mineral Pitches, Asphalts, Coal Tar Pitches, Creosote Residues

In general all the modifications that can be applied to vegetable or wood pitches can also be applied to these materials. These residues also have acidic groups which can be neutralized to reduce coking. However, the aromatic content of these by-products is generally higher than previously encountered and sooty flames result. This can be overcome to a large extent by the inclusion in the mix of suitable oxygen carriers such as nitrates, peroxides, perborates or persulphates.

Sugars, Syrups, Molasses

The combustible material may be a waste or by-product from the sugar industry since low grade sugars are a cheap source of heat.

Extraction of sugars from cane, beet, berries millet, fruit, maple, etc. after crushing of the base under high pressure, solvent extraction or tapping, proceeds in an established pattern; an initial crude liquor or syrup is obtained which in itself may be used as a fuel source when solidified by means discussed later in relation to molasses.

However, most sugar producing countries boil off excess water and filter to produce crude crystalline sugar called "muscovado", plantation white or "raws", together with molasses. During this initial conversion 96–97% of the sugars present are produced as crude crystalline sugars and 5% as syrups or molasses—viscous dark liquids of sugar content as high as 86% by weight. During processing, higher molecular weight saccharides are precipitated out by treatment with, for example, lime to produce powdered calcium saccharates. These salts can be used as fuels in synthetic logs.

If solid or crystalline sugars are used in making logs, the material is melted and sprayed onto the wood chips as for a normal molten fuel. The extrudability of the mix may be improved by the inclusion of modifiers such as polyols, polyethylene glycols, EVA copolymers, modified wood rosin esters, gums, waxes, fatty acids, fatty oils, alcohols or soaps.

Molasses is a more convenient and cheaper form of sugar for use as a fuel. It is liquid and can be pumped readily when warmed to a temperature as low as 80° F. Despite containing 20% or more by weight water it burns quite well. It can be readily converted into an extrudable solid form by the inclusion of relatively small amounts by weight of water soluble solids such as polyethylene glycols 0.5–5%; nonylphenols of high ethylene oxide content 1–10%; starches, gums or cellulose derivatives 0.25–5% gelatines, alginates or xanthates 0.25–2%; wood resins 1–10%.

A particularly useful modifier for molasses is the substance known as crude lecithin pitch, which is the end residue of the destructive distillation of soya beans. Purified lecithin is used in many dietary foods and vitamin preparations in which it is claimed to have advantageous properties. However, the crude pitch is found to exhibit a particularly useful property in that it will absorb the water present in molasses to form a solid. Blends of molasses and lecithin pitch in ratios between 2:1 and 0:1 appear useful for log manufacture.

Waxes may also be used to solidify molasses when incorporated into a log forming mixture. The wax is added last and preferably contains a small amount of an oil soluble emulsifier e.g. nonyl phenol ethoxylate. During the mixing process, the molasses is encapsulated in the wax, and on cooling a solid wax skin gives the log a cohesive structure. Molasses to wax ratios between 1:1 and 4:1 may be so utilized.

Other suitable modifier systems are similar to those discussed previously in relation to pitches.

Sugars and molasses tend to char and coke during combustion but this can be minimized by using the techniques previously discussed in relation to their use as modifiers for pitches.

A further series of problems are associated with water containing fuels such as molasses and lyes. Depending on the finished log density, the problem may be minor in nature or major. The synthetic logs currently on the market cover a wide range of density. Low density logs are extruded or formed using a relatively high speed but low compression ratio compactor or extruder. The log thus produced shows no signs of stress cracking but is larger in diameter to achieve a standard weight to length relationship. It is cohesively weak being spongy or soft in texture and often does not handle well during packaging and shipping. Thus it is not uncommon for such logs to arrive at the point of sale broken into two or more pieces.

High density logs are hence preferred as they are not only quite firm and handleable at the warm extrusion temperatures but on cooling they are hard and cohesive and very little damage is sustained during handling and transportation.

With low density logs few problems occur when using molasses even at relatively high levels e.g. up to 40% of total log weight, alone or together with up to 20% of sulphite lye. However, with high density logs some problems occur. Using normal feed grade molasses having 25% water content, no unusual problems occur when up to 25% of the wax is replaced e.g. 40 pts sawdust, 15 pts molasses, 45 pts wax. Above this level of molasses the increased moisture added via the molasses begins to plasticize the sawdust thereby making it increasingly elastic. If the higher solids sugar refinery grade of molasses (85% solids) is used, it can be used up to 25% of the total log weight before it too is donating sufficient water to effect the behaviour of the sawdust. When producing high density logs with high levels of molasses or lyes, swelling occurs as the logs leave the extruder and stress cracking develops in the log surface, whilst the logs feel springy and soft. The swelling and cracking associated with both grades of molasses can be overcome if they are added in a particular manner as follows.

If the total charge of wood is divided into two parts and the molasses is premixed with one portion, the problems are almost eliminated—certainly higher levels of the molasses can be used with no stress cracking. For example if 10 pts of sawdust are mixed with 25 pts of feed grade molasses a free flowing slightly tacky material results. A further 30 parts sawdust are then mixed in followed by 35 pts of wax. The mix has the texture of and behaves like a normal all wax formula giving no swelling or cracking. Higher levels of the refinery molasses can be similarly incorporated with no serious softening of the log. It appears that the improvement is as a result of confining the donated moisture to only a portion of the sawdust which is then dispersed by subsequent additions with wax impregnated material. As a result the springiness is dissipated and contained within the log giving little swelling and no visible cracking. The molasses impregnated wood particles and the wax containing particles may be made as separate mixes, cooled as necessary and blended just prior to extrusion.

Replacing part of the sawdust by a cellulosic material which absorbs moisture less readily or is less affected by absorbed water also reduces the swelling and cracking. For example the use of peanut shell fines, cocoa bean shell fines, coconut shell or walnut shell fines, bagasse, or paper pulp in part or whole replacement of the wood sawdust gives a log less subject to swelling and cracking. If this modification is combined with the preblending technique excellent firm logs are obtained. The nut shell replacements have an additional advantage due to being less absorbent in that lower overall fuel levels may be employed and yet normal log appearance and performance is maintained. All or part of the sawdust may also be replaced by coal dust.

Using the two charges of sawdust in the form of a preblend also solves two other opposing problems. If the molasses is added after the wax or soap fuel a sticky mix results which gives some build-up problems on transfer conveyors etc. The sticky mix can also run slower through the extruder or in extreme cases plugging of the extruder can result with excessive friction induced back pressure. If the molasses is added to the entire wood charge and wax or soap fuel is added last, build-up and plugging are avoided, but coking of the molasses during the burn is increased with suffocation of the fire. Both problems are solved by using the separate wood/fuel mix technique or preblend. Low levels of molasses may be satisfactorily incorporated by addition after part of the wax is charged and prior to the final portion of wax e.g. sawdust 40 pts, slack wax 22 pts molasses 15 pts, slack wax 23 pts added in order as written.

One final problem associated wih water containing fuels is the temporary loss of flame colour. If the chemicals added to produce coloured flames are added simultaneously with, prior to or immediately after, molasses or sulphite lye, the coloured flames are not evident at normal intensity until the logs have matured for several days e.g. at least 4 days. It is thought that the cause is the solution of the chemicals in the moisture donated by those aqueous fuels which probably occurs particularly if the mix is warmed by addition of molten fuels, e.g. wax etc. Recrystallization on aging results in the reappearance of the coloured flames which improve in intensity to normal as the crystals grow in size.

It is on the other hand also possible to take advantage of the absorbency of sawdust of low moisture content and some other cellulosic particulate materials such as wood flour. If molasses is mixed with such materials, and the latter are allowed time to absorb moisture from the molasses, the moisture content of the latter can be reduced to a level at which it becomes an extrudable solid, whilst the swelling and cracking problems discussed above are reduced since the cellulosic material has swelled prior to extrusion. The use of molasses alone with the cellulosic material will usually provide a log which burns too slowly and with excessive coking, but modifiers may be added to the molasses to avoid this, as already discussed above. Other materials may also be used in place of essentially cellulosic materials to absorb the moisture from molasses and to help provide the necessary skeleton for the log (although the coking of the molasses, even if reduced by modifiers, will contribute to the formation of such a skeleton). An example of such a material is soya flour or meal.

The selection of molasses type and lye depends on cost savings required, available cellulose base (nuts, shells, wood etc.) and manufacturing process. The lower solids molasses and lye are mobile liquids at ambient temperature and hence can be added cool. This reduces the efforts and costs involved in cooling the mixes to extrudable temperature. However, the high solids molasses has a higher heat value and gives less problems as previously discussed. An ideal compromise is to use a blend of high solids molasses and sulphite lye. For example 3 pts of 85% molasses, normally a highly viscous unpumpable liquid at ambient temperature, becomes a mobile liquid when mixed with one part 60% sulphite lye. The blend is 75% solids and burns with less coking then a 75% solids feed grade molasses. Alternatively 4 pts 85% molasses with 1 part 60% lye gives a mobile liquid which can be pumped of total solids 80%. This blend has a better heat value then 75% molasses and gives less swelling etc. as previously discussed.

Many different types of molasses are available depending on the source e.g.

| Origin | Viscosity CP at 20° C. ex factory | Viscosity CP at 20° C. feed grade (75% solids) |
|---|---|---|
| Cane Molasses | | |
| Ecuador | 28000 | 3250 |
| Iran | 7250 | 3250 |
| Pakistan | 8550 | 1680 |
| Brazil | 21100 | 4650 |
| Jamaica | 108200 | 10300 |
| Trinidad | 35560 | 4580 |
| Beet Molasses | | |
| Belgium | 5460 | 1460 |
| Germany | 13140 | 1800 |
| Turkey | 51700 | 2200 |
| Russia | 6700 | 2680 |

From the viewpoint of viscosity at low temperatures, beet molasses is desirable, being lower in viscosity at the same solids content. However, for firmness of the logs the reverse is true. Most molasses thicken and some "gel" in the presence of phosphoric acid or some organic acids. Use can be made of this effect to "body" up the molasses as shown in example 32. The acid is injected into the molasses stream just prior to reaching the sawdust or the acid can be added to the wood/molasses mix immediately the molasses has been added. The thickening is thought to be due to hydrogen bonding induced by polarization in the molasses.

A particularly useful means of controlling coking in the logs containing molasses is achieved by compounding the mix in a specific manner. In such a log, a double coking effect occurs. The residual resins and tar residues in the cellulosic material, eg. wood, coke and produce a carbon skeleton of some cohesive strength quite naturally during the burn. Indeed this is why normal wax based synthetic logs are so successful: when formulated properly, no sagging or dripping occurs as a result of the coking which occurs on partial combustion of the sawdust. The carbon skeleton acts as a porous but cohesive wick for the melting and burning fuel. When substantial amounts of molasses are introduced (above 5% of the total weight of the log) the wood carbon skeleton is reinforced by the molasses coke to a point where suffocation begins (at above 10% by weight of molasses). A dilution of the molasses coking effect can be achieved by preabsorbing all the molasses on part of the wood component eg. of the two following formulae, identical in overall composition, formula B shows markedly less suffocation than A as the second charge of untreated wood dilutes the molasses coking effect.

| | A | B | |
|---|---|---|---|
| Sawdust (1) | 40 | 20 | parts by weight |
| Molasses | 25 | 25 | parts by weight |
| Sawdust (2) | φ | 20 | parts by weight |
| Slack Wax | 35 | 35 | parts by weight |

The ingredients were added consecutively in the order shown and mixed thoroughly prior to subsequent additions. Many useful and unexpected features occur with logs made incorporating molasses viz:

(1) Reduced Smoke during burning

Side by side comparisons of totally wax logs, wax plus pitch logs, and wax plus molasses logs show that with molasses visibly less smoke is evolved. The smoke normally is of two forms—white smoke which is a vapour of unburnt fuel eg. wax vapour or black smoke as a result of incomplete combustion. Totally wax logs can give undesirable amounts of the white smoke as a result of flash boiling at the surface. Pitch, particularly tall oil and coal tar give black smoke as a result of partial combustion of the aromatic components therein. Either or both these components used in conjunction with molasses give reduced smoke. It is believed the reduction in smoke is due to two effects—molasses has oxygen in its structure and hence should burn less smokily, but its tendency to coke also results in a slower release of other fuels present and hence a higher oxygen to fuel ratio reduces the vapour smoke and black smoke. Reduced smoking is desirable not only for aesthetic reasons, but also because it reduces the formation of flammable deposits in chimneys and flues.

(2) Increased Hardness

Despite molasses being a mobile or viscous liquid at room temperature, logs made using molasses are generally harder than when made with even the hardest of slack waxes. Slack waxes are most often derived from the dewaxing of lubricating oils and the texture of the resulting wax varies considerably depending on the dewaxing process, the source of the crude oil utilized and the type of lubricating oil being produced from the refinery tower. For example, American crudes produce quite soft slack waxes often with the texture of petroleum jelly or margarine whereas certain Canadian crudes yield slack waxes which are quite firm at room temperature. In particular the higher the viscosity the oil being separated, the more cohesive and the higher the melting point of the slack wax by-product becomes. With the trend to using lower viscosity base oils in motor oils, the slack waxes produced have generally tended to become softer and/or of lower melting point. This trend in turn results in the production of softer synthetic logs—an undesirable effect since such logs do not handle well during packaging and are subject to more damage during shipping and warehousing. The addition of molasses counteracts this trend as shown by the following tests of the hardness of different log mixes, thus enabling quite soft and mobile waxes or fuels to be used without producing a softer log.

Hardness of Log Mixes

Method: a dial vernier with a spring return was modified with a 3/16" cone penetration tip and a platform to take varying weights. The cone tip was placed on the surface to be tested and weights were added. Penetration was measured over an elapsed time period, ie. the higher the penetration reading, the softer the surface.

The slack waxes used as a binder component of the log mixes are listed in Table 1. Samples were made using 60% by weight binder component and 40% by weight sawdust, the compositions of the binder component and the resulting hardness readings being tabulated in Table 2.

The same hardening effect has been observed even when liquid fuels are used as a partial replacement of the slack wax, eg.

| Liquid Fuel | Texture at Room Temperature |
|---|---|
| Tall Oil Pitch (TOP) | Viscous Liquid |
| Vegetable Oil Pitch (VP) | Thin Liquid |
| Used Cooking Oil (UCO) | Thin Liquid |

Samples were made and tested as above, the compositions of the binder components and the resulting hardness readings being tabulated in Table 3.

The hardening effect of molasses is thought to be due to two main reactions. Firstly the moisture present in molasses and not present in slack waxes or pitches, may be preferentially absorbed by the kiln dried sawdust conventionally utilized in artificial firelogs leaving a solid molasses sugar residue on the outside of the wood particles. A probably more significant cause is the gellation effect of acids on molasses. Some types of molasses have been known to gel when compounded into animal feedstocks and these grades are either avoided or have to be used carefully to avoid problems in such applications. Some previous work carried out suggests that a particular component of these unusual molasses is acid sensitive and gelation occurs as a result, although the mechanism has not been fully explained.

TABLE 1

| | | SLACK WAXES USED | | |
|---|---|---|---|---|
| Type | Source | Typical Congealing Point | Typical Softening Point | Texture Room Temperature |
| 1701 | Imperial Oil Canada | 147° F. | 120° F. | Firm Cheesy Solid |
| 1714 | Imperial Oil Canada | 120° F. | 95° F. | Soft Oily Solid |
| VCS | Standard Oil Ohio | 135° F. | 95° F. | Soft Oily Semi Solid |
| LT53 | Amoco U.S.A. | 145° F. | 95° F. | Soft Oily Semi Solid |
| PRO-86 | Mobiloil U.S.A. | 130° F. | 95° F. | Soft Oily Semi Solid |

TABLE 2

BINDER COMPONENTS AND HARDENESS READINGS

| COMPOSITION BY WEIGHT OF BINDER COMPONENT | | | | | | PENETRATION READINGS | | | | | |
|---|---|---|---|---|---|---|---|---|---|---|---|
| | | | | | | 100 Grm Wt at RT | | 500 Grm Wt RT | | 100 Grm Wt at 110° F. | |
| 1701 | 1714 | VCS | LT53 | PRO 86 | Molasses | 15sec | 150sec | 15sec | 150sec | 15sec | 150sec |
| 100 | — | — | — | — | — | 6 | 9 | 36 | 40 | 27 | 30 |
| 75 | 25 | — | — | — | — | 14 | 18 | 42 | 56 | 93 | 104 |
| 75 | — | — | 25 | — | — | 19 | 23 | — | — | 49 | 56 |
| 65 | 25 | — | — | — | 10 | 11 | 16 | — | — | 29 | 35 |
| 62.5 | 22.5 | — | — | — | 15 | 9 | 13 | — | — | 26 | 29 |
| 54 | 21 | — | — | — | 25 | 9 | 13 | — | — | 13 | 14 |
| 50 | 20 | — | — | — | 30 | 8 | 11 | 33 | 46 | 8 | 9 |
| 50 | — | — | 20 | — | 30 | 9 | 13 | — | — | 27 | 32 |
| — | — | — | — | 100 | — | 15 | 19 | 72 | 80 | 22 | 24 |

TABLE 2-continued

| BINDER COMPONENTS AND HARDENESS READINGS | | | | | | | | | | | |
|---|---|---|---|---|---|---|---|---|---|---|---|
| COMPOSITION BY WEIGHT OF BINDER COMPONENT | | | | | | PENETRATION READINGS | | | | | |
| | | | | | | 100 Grm Wt at RT | | 500 Grm Wt RT | | 100 Grm Wt at 110° F. | |
| 1701 | 1714 | VCS | LT53 | PRO 86 | Molasses | 15sec | 150sec | 15sec | 150sec | 15sec | 150sec |
| 50 | — | — | — | 20 | 30 | 12 | 18 | 63 | 77 | 9 | 12 |
| — | — | — | 100 | — | — | 43 | 61 | 182 | 240 | 79 | 83 |
| 80 | — | 20 | — | — | — | 22 | 30 | — | — | 55 | 65 |
| 60 | — | 20 | — | — | 20 | 7 | 15 | 63 | 75 | 30 | 42 |

TABLE 3

| COMPOSITION BY WEIGHT OF BINDER COMPONENT | | | | | PENETRATION READINGS IN MILS | | | |
|---|---|---|---|---|---|---|---|---|
| | | | | | 500 Grm Wt at RT | | 500 Grm Wt at 110° F. | |
| 1701 | TOP | VP | UCO | Molasses | 15sec | 150sec | 15sec | 150sec |
| 90 | 10 | — | — | — | 37 | 51 | 144 | 196 |
| 70 | 30 | — | — | — | 47 | 61 | 500 | off scale |
| 70 | 15 | — | — | 15 | 42 | 56 | 155 | 193 |
| 51 | 17 | — | — | 31 | 33 | 43 | 111 | 127 |
| 83 | — | 17 | — | — | 47 | 59 | 158 | 179 |
| 50 | — | 17 | — | 33 | 45 | 55 | 140 | 152 |
| 83 | — | — | 17 | — | 50 | 62 | 160 | — |
| 50 | — | — | 17 | 33 | 46 | 57 | — | — |

We have found that in the presence of phosphoric acid at particular levels even a molasses considered to be non-gelling can be made to gel. Over a fairly narrow ratio of molasses to phosphoric acid gelation occurs and the viscosity increases at lower levels of addition suggest a stoichemetric mechanism ie. the phosphoric acid radicals combine in some way with the molasses to form a new "compolymer". However other acids particularly organic acids are known to exhibit a similar effect. Since wood is acidic it is believed that the acid radicals in the sawdust cause the hardening due to gellation of log mixes containing molasses. This was confirmed by adding a small quantity of sodium carbonate to one of two otherwise similar batches of a log mix containing 35 parts by weight of sawdust, 20 parts by weight of molasses and 45 parts by weight of molasses. The neutralisation of the wood acids by the sodium carbonate was found to result in a marked reduction in the hardness of the mix, confirming that the acidity of the wood contributes to the hardening process. With the pressure of carboxylic acids, amino acids and hydroxyl groups in molasses, and similar groups in wood, it is likely that the hardening is as a result of copolymerisation of molasses ingredients and wood components to form for example esters, ethers or polyamides. The acid gelling effect can be promoted by addition to the mix of phosphoric acid or other acid donating chemicals to speed up gellation.

Whilst the water content of molasses might appear to be undesirable, the water can in fact lead to improved combustion. Papers presented to the Wood Energy Institute of Canada in 1978 shows that wood burns most efficiently at a moisture content of 12–22%. Normally kiln dried wood is used for synthetic logs, having a moisture content of 6–10% by weight since with higher moisture contents extrusion problems occur as the wood becomes springy. Additions of 20% by weight molasses having 80% by weight active solids to a log mix gives an improved wood moisture content, from the point of view of combustion efficiency, but the moisture is trapped in the molasses and does not interfere with the extrusion behaviour of the mixture.

Waste Oils and Used Oils-Mineral, Aminal and Vegetable

This is a particularly important group since not only are used or waste oils cheap useful sources of heat as a fuel but, with conservation and energy economy major current social problems, the non-polluting disposal of such waste products is of major significance.

Waste or used oils fall into two groups, mineral or non-edible oils and edible oils. Activities where fairly large quantities of used oils accumulate are:

(1) Automotive service station: used engine oils, transmission oils, etc.
(2) Restaurants and hotels: used cooking oils.
(3) Heavy industry, sheet metal manufacturers, etc.: lubricating or metal surface preparation oils.
(4) Ship repair harbours: waste bunkering oils, hydraulic oils and engine oils.
(5) Metal filament industry: oils used during the drawing process in wire manufacture.
(6) Slaughter houses: waste fats and animal oils.
(7) Tanning industry: hide oils produced during curing.
(8) Soap and food manufacture: off colour or contaminated fatty oils, etc.
(9) Paint and varnish manufacture: reject castor oils, varnish oils, etc.

All oils are useful fuels and can be converted into a form suitable for synthetic log manufacture. Conversion into an extrudable solid form suitable for log manufacture can be achieved in a variety of ways, but all rely on inclusion of the oils into a solid solution. Most organic solids will absorb varying amounts of oils before losing their solid form at room temperaure. Particularly useful solids are waxes, fatty acids and glycerides, rosins, rosin esters, soaps, synthetic polymers such as polystyrene, polybutadienes, isoprenes, polyolefins, and polybutylenes.

For example, waxes can retain up to 30–40% by weight of oils before losing their solid form at room temperature. Blends of waxes are particularly desirable-paraffins of varying melting points up to 160° F. not only retain oils (particularly mineral types) but can give a quite firm solid at room temperature, as illustrated by the following table:

| Refined Paraffin Wax Mpt° F. | % used oil | Texture After Cooling |
|---|---|---|
| 125° | 30 | Soft Oily Semi Solid |
| 155° | 30 | Slurry With Oil Separation |
| 50% - 125°; 50% - 155° 25% - 125°; 25% - 135°; | 30 | Fairly Firm Solid |

-continued

| Refined Paraffin Wax Mpt° F. | % used oil | Texture After Cooling |
|---|---|---|
| 25% - 145°; 25% - 160° | 30 | Firm Solid |

The texture of the above blends may be further enhanced by dissolving in the hot blend small amounts (0.25-20%) of other solids such as the following: polyethylene, polypropylene, polyvinylpyrrolidone, polybutylene, polyisoprene, polyisobutylene, polybutadiene, microcrystalline waxes, and narual waxes such as carnuba or montan.

A particularly efficient group of polymers for providing solid solutions of oils is the diene polymers. For example, if a polybutadiene is formed with suitable catalysts (lithium aluminum hydride or titanium tetraiodide) to give a high level of transfiguration it will retain as much as 96% by weight of oils. The polydiene is heated in the oil until dissolved and thoroughly dispersed: spraying of this solution onto the sawdust followed by cooling and extrusion gave cohesive logs of good fireplace performance. Other polymers may be also dissolved in the hot solution e.g. polyethylene, which acts as a cheaper extender for the diene, also gives a more cohesive structure if added at levels such as to replace 10-50% of the polydiene. Natural rubber or gutta percha, which are polydienes of high trans configurations, can also be used in a similar manner.

Solid solutions such as those described in the preceding paragraph can also be utilized to form satisfactory logs with reduced contents of cellulosic material, or even without cellulosic material, since the polymers will carbonise during combustion so as to release the oil and at the same time provide the required porous skeleton. Gutta percha provides particularly good results under these circumstances.

Edible oils and other animal, fish or vegetable oils can be retained by mineral oil based carrier solids, particularly micro-crystalline waxes at, for example, up to 30% by weight of oil. However, more cohesive and firmer solid solutions can be prepared by using non-mineral carrier solids such as carnuba wax, rosins, stearic acid, and linolenic and linoleic acid salts.

The solid solutions are prepared by dissolving the oil in the carrier solid applying heat if necessary. Neutralisation to form a salt, for example, in the case of oleic or linoleic acid may be carried out in solution or during preparation of the log mix as described previously. Blends of oleic, linoleic and linolenic acid with up to 40% dissolved oil and when suitably neutralised and prepared for log manufacture (mixed with a wicking agent of wood sawdust) make excellent logs with good burning properties.

In some cases, even when all the chemical modifications discussed above (eg. neutralisation to minimize coking, acidification to assist degration), the resultant log continues to burn in an unsatisfactory manner. Other modifiers can then be employed to overcome the problem. Typical types of unsatisfactory burning take two opposite forms:

(1) Inadequate Combustion (Slowness in Lighting, Suffocation or Incomplete Combustion)

This may be corrected by one or more of the following means:

(a) Inclusion in the solid fuel of small amounts of volatile or low flashpoint materials. For example, a log comprising a fuel of vegetable and tall oil pitch hardened with sodium oleate gave a log which burned with small flames for an excessively long time. Its burning time could be reduced by the addition to the hot fuel solution 5-15% of fuel oil, kerosene, trioxane or acetic acid. A similar reduction on burning time and increase in flame height was achieved by adding 5-20% by weight polyoxyethylene glycol (paraformaldehyde) to the sawdust before addition of the hot fuel solution.

Figure 1A:
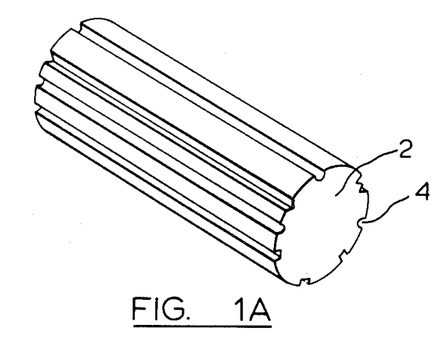
FIGS. 1A, 2A and 3A show different forms of extruded firelog.
Figure 1B:
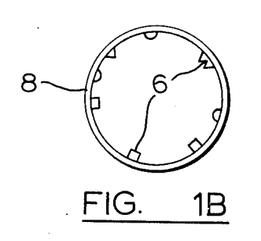
FIGS. 1B, 2B and 3B show, diagrammatically, relevant portions of apparatus for extruding such logs.
Figure 2A:
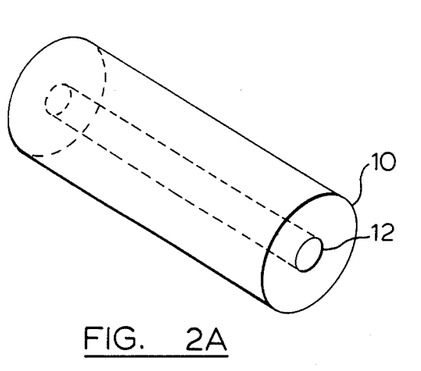
Figure 2B:
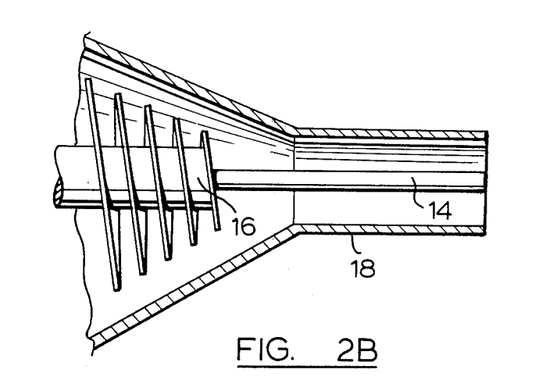

(b) Physical changes in the log shape. For example, a circular log 2 with a barely adequate burning rate was improved by the formation of grooves 4 along its length as shown in FIG. 1A, either by cutting or scooping material out of the log after extrusion or by forming projections 6 in the extruder barrel 8 as shown in FIG. 1B. The flames from ignition spread more rapidly along the edges of the grooves and during the burn fissures developed at the bottom of the grooves, allowing faster relase of the fuel. This gave more pleasing taller flames and a shorter burning time. An equally good improvement in performance was achieved on a log which suffered from suffocation problems (incomplete combustion due to coke formation) by forming a hole along its axis as shown in FIG. 2A, using an extruder modification as shown in FIG. 2B, in which a rod 14 was attached to the extruder screw 16 so as to extend through the barrel 18.

Figure 3A:
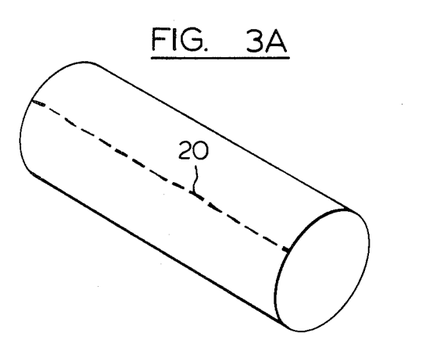
Figure 3B:
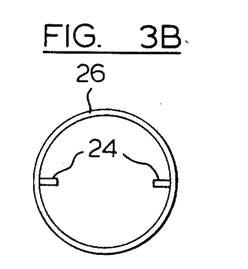

(c) Flaws 20 (see FIG. 3A) were developed in logs 22 otherwise similar to those discussed under (b) above by insertion in the extruder forming barrel 20 of short pins or rods 24 close to the end of the barrel as shown in FIG. 3B. This gave high turbulence pressure points in the barrel where they were situated and as a result, during the fireplace life of the logs they developed large flaws 20 in the form of cracks at the location of the pressure points as shown in FIG. 3A. Fuel again was able to escape more readily through the cracks giving bright tall flames and complete combustion. Cracking was also successfully induced using thermally expansible materials in the mix eg. seeds of various descriptions such as rice or corn, encapsulated water, very coarse wood slivers, and expansible polystyrene beads.

(d) Subdivision of the material showing coking tendencies can be achieved by coating presaturated sawdust with a non-coking fuel such as wax. For example, molasses preblended with sawdust is further coated with wax to keep the molasses from forming "coke bridges" across adjacent particles.

(e) A compatible wetting agent may be added to a fuel showing coking tendencies, e.g. nonylphenol 10 mol ethylene oxide in molasses at 0.5-5%, nonylphenol 4-6 mol ethylene oxide in pitches, nonylphenol 3 mol ethylene oxide in asphalt.

(f) Antioxidants may be added to the fuel showing coking tendencies e.g. phenol may be added to pitches, furfuryl alcohol or furfuryl aldehyde to molasses.

(2) Excessive Combustibility (Excessive Flare Up/Rapid Burning/Excessively Tall Flames)

Logs made using used and waste oils trapped in a wax solution initially gave tall flaring flames with a resulting disappointingly short burn time. The burn time was extended by the inclusion in the mix of small amounts of fire retardants e.g. 5-20% sodium phosphate, 2-8% sodium iodide or chloride, 0.5-7% urea formaldehyde resin, 2-8% sodium carbonate, 0.5-4% asbestos fibre, 0.5-5% melamine resin, 1-12% dicyandiamide or urea.

Whilst synthetic fireplace logs have in the past generally utilized particulate wood, particularly sawdust, as a carrier for the fuel component, other particles derived from cellulosic materials may be used. The particles may be of natural or processed cellulosic material such as bagasse, chopped straw, waste paper in pulped, shredded or flaked forms, sphagnum moss, nut shells, coffee grounds, fibrous residues remaining after the extraction of juices or oils from vegetables and fruit, cotton waste, and bark. Alternatively, particles of regenerated cellulose or cellulose esters may be utilized, or particles of materials derived by total or partial degeneration and mineralization of cellulosic materials such as peat, lignite and coal. The state of division of the material should be such as to permit them to act as a carrier and working agent for the fuel component. If the material is in the form of fine fibres or thin webs, then it need not be very finely divided.

Non-cellulosic combustible materials may also be utilised, such as coal dust, though the lack of absorbency of the latter may be a problem with certain types of liquid by-product. Soya flour is another combustible material which may be utilised, and which has a high melting point. It is also possible to utilise non-combustible solids to provide the basis of the log skeleton, such a diatomaceous earths, clays or rock wools, although preferably such non-combustible materials should not form too large a proportion of the total weight of the log. Non cellulosic organic fibres may also be utilised, particularly those that will carbonise at high temperatures to provide the desired skeleton.

When non-cellulosic materials such as coal dust are utilised, the coking properties of molasses may be used to advantage. The ash residue left from a log containing a substantial amount of molasses after all the volatile fuels are exhausted (flames disappear) is a firm cohesive brightly glowing block shaped ember not unlike a coal ember. This ember is attractive and prolongs the aesthetically useful life of the log by up to 45 minutes. Normally the ash from synthetic logs has a dull red glow which is at best barely visible. A more important advantage of the coking of molasses is that it facilitates the use of non-cellulosic corriers which either will not themselves coke or which will only coke at high temperatures. For example bituminous coal dust, anthracite dust, carbon dust and graphite powders are useful cheap fuels. However, without a coking binder, such materials crumble too rapidly during burning. Molasses forms the basis of an excellent coking binder for this purpose and hence a synthetic log based on coal dust or similar material may be produced. Typical formulae comprise:

| (1) Coal Dust | 70 pts by wt |
| Molasses | 50-35 pts by wt |
| (2) Gas or Oil | |
| Coke Dust | 70 pts by wt |
| Molasses | 45-30 pts by wt |

These two basic formulae are somewhat soft and the molasses is solidified by the inclusion of slack waxes of the 778 type in place of part of the molasses (up to 50% replacement), and/or suitable oil soluble emulsifier (eg. nonyl phenol ethoxylate) may be added at up to 1% to give improved texture. Other heat resistant fuels or polymers may also be used as modifiers, eg. one of the following:

| 2-40 | pts lignosulphonate powder |
| ½-5 | pts melamine resin powder |
| 5-40 | pts pitches of any or all varieties |
| ½-5 | pts Polyethylene, polypropylene, polyvinyl acetate |
| ½-10 | pts Phenolic resins |

A solid emulsion can be obtain by using water based polymers, for example the following formulation gives good results:

| Coal Dust | 70 pts |
| 60% Urea Formaldehyde resin | 3-20 pts |
| Molasses | 15-50 pts |
| Slack Wax | 15-0 pts |
| Emulsifier | 0.25-1 pts |

The emulsifier in this case is a water soluble emulsifier eq. sulphosuccinates, benzene sulphonates, naphthalene sulphonates.

Polymerisation of the resin is achieved by addition of conventional acid catalysts eg. phosphoric acid or strong organic acids such as benzene sulphonic acid or paratoluene sulphonic acid. The heat resistance of these mixes can be enhanced by addition of small amounts of melamine, phenol, resorcinol, furfuryl alcohol, furfuraldehyde, or dicyandiamide. These reinforcing agents can be usefully employed at levels as low as 2% or as high as 30% by weight based on the weight of the urea resin.

The cellulosic or other substitute particulate materials will normally form about 35-40% by weight of the log, although contents in the range 25% to 70% by weight are possible provided that the combustion properties required of a firelog can be obtained. Moreover, as described elsewhere in this disclosure, contents down to zero may be utilized provided that components are present capable of forming an adequate skeleton during combustion of the log.

Regardless of the materials utilised to form the log it is important that whatever constituent of the log mix which is used to solidify the liquid combustible by-product is thoroughly blended therewith, so as to achieve the necessary physical or chemical interaction. This is particularly so when the liquid by-product is solidified by dispersion in another material, or by reason of other material absorbing liquid therefrom.

The invention is further illustrated by the following tabulated examples of log formulations. The ingredients listed in each example under the heading "Formula" were thoroughly mixed in the order given; and extruded into shape of a conventional cylindrical log weighing about 3 kg., the combustion behaviour of which was then observed and is noted under the heading "Burn Comments".

In the burning of logs in accordance with the various examples, the burn was considered to last from the time that the log was lighted until the flames died out. For a satisfactory burn, the rate of burning should be aesthetically satisfactory through substantially the entire burn once the log is fully alight, ie. a cheerful flame effect should be provided without excessive flaring or flame height such as to prejudice safety, the duration of the burn should be satisfactory, ideally about three hours, the log should substantially retain its shape and dimensions, although some shrinkage will normally occur, and substantially the whole of the volatile fuels contained by the log should be consumed. The skeleton formed by most of the log compositions described and exemplified will be formed largely of carbon, in which a flameless combustion process will often continue after completion of the normal burn, resulting in subsequent breakdown of the skeleton into mineral ash. However, the log should be formulated so that at least 85% of the total combustible content of the log is consumed during the burn, including at least 95% and preferably at least 98% of the volatile combustibles. The above requirements were met by those logs exemplified which were said to achieve a good or improved burn, or to burn well, very comfortably met by those which achieved a very good or excellent burn, and just met by those achieving a fairly good burn. Those logs which suffocated did not burn well, and went out before all the volatile combustibles contained therein were consumed.

| Example | Formula | | Burn Comments |
|---|---|---|---|
| (1) | vegetable pitch (by weight) | 60 pts. | suffocated due to coking improved burn with grooves, centre hole or induced flaw |
| | cocoanut monoethanolamine | 3 pts. | |
| | sawdust 20 mesh | 37 pts. | |
| (2) | vegetable pitch | 60 pts. | burned well with little coking, improved with addition of 6 pts. slack wax |
| | nonylphenol ethoxylate (50 EtO) | 3 pts. | |
| | sawdust 20 mesh | 37 pts. | |
| (3) | vegetable pitch | 60 pts. | suffocated due to coking improved burn replacing 20 mesh with 80-100 mesh sawdust or addition of 10 pts. china clay or addition of 6 parts mineral wax or addition of 5 pts. 50% sodium hydroxide or 6 pts. wax |
| | hydrogenated glycerides | 6 pts. | |
| | sawdust 20 mesh | 37 pts. | |
| (4) | vegetable pitch | 60 pts. | suffocated due to coking, improved as in (3) and by addition of 4 pts. wood rosi |
| | stearic acid | 6 pts. | |
| | sawdust 20 mesh | 37 pts. | |
| (5) | vegetable pitch | 60 pts. | good burn |
| | polyglycol ether | 3 pts. | |
| | sawdust 20 mesh | 37 pts. | |
| (6) | vegetable pitch | 60 pts. | fairly good burn improved by neutralisation with caustic soda or as in (1) |
| | refined wax 155° F. Mpt | 5 pts. | |
| | polyethylene | 1 pts. | |
| | sawdust 20 mesh | 37 pts. | |
| (7) | vegetable pitch | 40 pts. | coking, burn improved as in (1) and by addition of ½-5 pts. aluminium sulphate or phthalic anhydride |
| | sugar | 20 pts. | |
| | wood sawdust 20 mesh | 40 pts. | |
| (8) | vegetable pitch | 60 pts. | good burn |
| | oleic acid | 6 pts. | |
| | 50% caustic soda or sodium carbonate | 3 pts. | |
| | | 3 pts. | |
| | wood sawdust 20 mesh | 37 pts. | |
| (9) | vegetable pitch | 60 pts. | good burn |
| | polyethylene glycol solid | 3 pts. | |
| | 50% caustic soda | 12 pts. | |
| | wood sawdust 20 mesh | 37 pts. | |
| (10) | tall oil pitch | 60 pts. | good burn |
| | oleic acid | 4½ pts. | |
| | 50% caustic soda | 3 pts. | |
| | wood sawdust 20 mesh | 37 pts. | |
| (11) | vegetable or tall oil pitch | 60 pts. | fairly good burn some coking improved by addition of 3 pts. 50% alkali or 6 pts. wax |
| | wood rosin or ester thereof | 6 pts. | |
| | wood sawdust 20 mesh | 37 pts. | |
| (12) | vegetable or tall oil pitch | 60 pts. | fairly good burn as (11) |
| | mixed fatty acids (oleic, lineolic, linolenic etc.) | 6 pts. | |
| | wood sawdust 20 mesh | 37 pts. | |
| (13) | 86% molasses | 60 pts. | fairly good burn some coking improved by addition of aluminium sulphate (1-3 pts.), or 6 pts. wax |
| | polyethylene glycol (solid) | 6 pts. | |
| | wood sawdust 20 mesh | | |
| (14) | 86% molasses | 60 pts. | as (13) |
| | rosin or starch | 2 pts. | |
| | wood sawdust 20 mesh | 37 pts. | |
| (15) | 86% molasses | 60 pts. | good burn, slight coking reduced by addition of 3 pts. slack wax or 3 pts. nonyl phenol ethoxylate |
| | Xanthum gum | 0.3 pts. | |
| | wood 20 mesh | 40 pts. | |
| (16) | 86% molasses | 60 pts. | as (15) |
| | alginate | 0.3 pts. | |
| | wood 20 mesh | 40 pts. | |
| (17) | refined paraffin wax 140° F. Mpt | 30 pts. | very good burn |
| | microcrystalline 160° F. Mpt | 10 pts. | |
| | used engine oil | 20 pts. | |
| | wood 20 mesh | 40 pts. | |
| (18) | polybutadiene (trans form) | 6 pts. | very good burn |
| | polyethylene | 1 pts. | |
| | used engine oil | 53 pts. | |
| | wood 20 mesh | 40 pts. | |
| (19) | vegetable acid blend (oleic, linoleic and linolenic) | 30 pts. | good burn |
| | used cooking oil | 30 pts. | |
| | Sodium carbonate | 6 pts. | |
| | wood 20 mesh | 40 pts. | |
| (20) | crude cocoanut fatty acid | 30 pts. | good burn |
| | off colour fish oil | 25 pts. | |
| | slack wax | 5 pts. | |
| | sodium carbonate | 5 pts. | |
| | wood 20 mesh | 40 pts. | |
| (21) | tall oil pitche | 30 pts. | good burn, some coking reduced by additional 1 part sodium carbonate |
| | slack wax | 30 pts. | |
| | wood 20 mesh | 40 pts. | |
| (22) | tall oil pitch | 10 pts. | |
| | sodium carbonate | 8 pts. | |
| | molasses (85%) | 20 pts. | |
| | slack wax | 20 pts. | |
| | nonyl phenol ethoxylate (4 EtO) | 1 pts. | |
| | wood 20 mesh | 40 pts. | very good burn |
| (23) | tall oil pitch | 10 pts. | |
| | sodium carbonate | 8 pts. | |
| | molasses (85%) | 20 pts. | |
| | slack wax | 20 pts. | |
| | nonyl phenol ethoxylate (4 EtO) | 1 pts. | |
| | bagasse (finely divided) | 40 pts. | very good burn |
| (24) | vegetable pitch | 30 pts. | |
| | sodium carbonate | 6 pts. | |
| | paraformaldehyde | 5 pts. | |
| | molasses | 30 pts. | |
| | wood 20 mesh | 40 pts. | very good burn |
| (25) | molasses | 25 pts. | |
| | slack wax | 30 pts. | |
| | finely divided crushed peanut | | |

-continued

| Example | Formula | | Burn Comments |
|---|---|---|---|
| | shells | 45 pts. | very good burn |
| (26) | vegetable pitch | 60 pts. | |
| | oleic acid | 6 pts. | |
| | 50% caustic soda | 3 pts. | |
| | coffee grounds | 37 pts. | good burn |
| (27) | vegetable pitch | 60 pts. | |
| | polyehtylene glycol solid | 3 pts. | |
| | 50% caustic soda | 12 pts. | |
| | sawdust 20 mesh | 18 pts. | |
| | shredded waste paper | 18 pts. | good burn |
| (28) | sawdust | 40 pts. | spongy log but good burn |
| | molasses (75% solids) | 15 pts. | |
| | slack wax | 45 pts. | |
| (29) | sawdust | 10 pts. | firm log, excellent burn |
| | molasses (75% solids) | 25 pts. | |
| | sawdust | 30 pts. | |
| | slack wax | 35 pts. | |
| (30) | sawdust | 10 pts. | very hard log, excellent burn |
| | molasses (85% solids) | 25 pts. | |
| | sawdust | 30 pts. | |
| | slack wax | 35 pts. | |
| (31) | sawdust | 10 pts. | hard log, excellent burn |
| | 60% sulphite lye | 5 pts. | pre mixed |
| | 85% molasses | 20 pts. | |
| | sawdust | 30 pts. | |
| | slack wax | 35 pts. | |
| (32) | sawdust | 10 pts. | firm log, good burn |
| | molasses (75%) | 30 pts. | mixed in stream |
| | 85% phosphoric acid | 3 pts. | |
| | sawdust | 30 pts. | |
| | slack wax | 30 pts. | |
| (33) | vegetable pitch | 60 pts. | |
| | nonyl phenol ethoxylate (50 EtO) | 3 pts. | |
| | coal dust | 37 pts. | good burn |

What is claim is:

1. A synthetic firelog comprises an extruded mass of a material sufficiently solid to hold its shape at normal room temperatures, and carbonizable on combustion to provide a porous skeleton which will substantially maintain the configuration of the log, the material consisting essentially of 25% to 70% of particulate solid combustible material, the balance being a combustible solid binder, the binder comprising a major proportion of a normally liquid combustible byproduct modified by the presence of fatty acid salts in a quantity sufficient to solidify the binder, the combustibility of the extruded mass being such as to provide a safe but aesthetically acceptable rate of burning under fire-grate conditions from the time the log is fully alight until substantial consumption of the volatilizable content of the log.

2. A firelog according to claim 1, wherein the by-product contains fatty acids, and the fatty acid salts are produced at least in part by the neutralization of said fatty acids present in the by-product.

3. A synthetic firelog comprising an extruded mass of a material sufficiently solid to hold its shape at normal room temperatures, and carbonizable on combustion to provide a porous skeleton which will substantially maintain the configuration of the log, the material comprising a mixture of particles of solid combustible material and a combustible solid binder, the binder forming at least 30% by weight of the log and comprising at least about 25% by weight of the binder of molasses, together with sufficient water-absorbent cellulosic material to solidify the molasses.

4. A firelog according to claim 3, wherein the constituent capable of solidifying molasses comprises a water-absorbent cellulosic material.

5. A firelog according to claim 3, wherein the particulate material and the water-absorbent particulate cellulosic material are separate additions of wood particles.

* * * * *